United States Patent
Li et al.

(10) Patent No.: US 11,714,027 B2
(45) Date of Patent: Aug. 1, 2023

(54) MEASURING DEVICE FOR TESTING WAVE DISSIPATION CHARACTERISTICS OF COMB-TYPED PERMEABLE BREAKWATER WITH ARC-SHAPED WALLS IN FLUME

(71) Applicant: LUDONG UNIVERSITY, Yantai (CN)

(72) Inventors: Xueyan Li, Yantai (CN); Zhenhua Zhang, Yantai (CN); Zhi Cheng, Weifang (CN); Xiaomin Xie, Xinzhou (CN); Xiang Wan, Pucheng County (CN)

(73) Assignee: LUDONG UNIVERSITY, Yantai (CN)

( * ) Notice: Subject to any disclaimer, the term of this patent is extended or adjusted under 35 U.S.C. 154(b) by 43 days.

(21) Appl. No.: 17/522,935

(22) Filed: Nov. 10, 2021

(65) Prior Publication Data

US 2022/0390319 A1    Dec. 8, 2022

(30) Foreign Application Priority Data

Jun. 2, 2021   (CN) .......................... 202110611906.7

(51) Int. Cl.
*G01M 10/00*    (2006.01)
(52) U.S. Cl.
CPC .................................. *G01M 10/00* (2013.01)
(58) Field of Classification Search
CPC ..................................................... G01M 10/00
USPC ........................................................ 73/170.31
See application file for complete search history.

(56) References Cited

U.S. PATENT DOCUMENTS 4,000,646 A * 1/1977 Mott ....................... B63B 39/14
73/170.31

FOREIGN PATENT DOCUMENTS

| CN | 110375958 A | * | 10/2019 |
| CN | 209741790 U | * | 12/2019 |
| TW | 201241276 A | * | 10/2012 |

OTHER PUBLICATIONS

English translation for CN 209741790 U (Year: 2019).*
English translation for CN-110375958-A (Year: 2019).*
English translation for TW 201241276 A (Year: 2012).*

* cited by examiner

*Primary Examiner* — Alesa Allgood
*Assistant Examiner* — Byung Ro Lee
(74) *Attorney, Agent, or Firm* — Andrew C. Cheng

(57) ABSTRACT

A measuring device for testing wave dissipation characteristics of a comb-typed permeable breakwater with arc-shaped walls in a flume is provided. The measuring device comprises three parts: a comb-typed permeable breakwater with arc-shaped walls, wave height measuring instrument fixing and adjusting devices, and a wave height measuring instrument data collecting and processing equipment. The comb-typed permeable breakwater with arc-shaped walls is formed by fixedly connecting upright arc-shaped caissons, a back plate, partition plates, L-shaped connecting plates and a bottom plate. The wave height measuring instrument fixing and adjusting devices are configured for accurately fixing the wave height measuring instrument and adjusting its horizontal position and vertical height. The wave height measuring instrument data collecting and processing equipment is configured for processing, outputting and displaying the data collected by the wave height measuring instrument. The measuring device has stable structure, strong operability and high experimental precision.

2 Claims, 3 Drawing Sheets

MEASURING DEVICE FOR TESTING WAVE DISSIPATION CHARACTERISTICS OF COMB-TYPED PERMEABLE BREAKWATER WITH ARC-SHAPED WALLS IN FLUME

TECHNICAL FIELD

The invention relates to the technical field of structural hydrodynamic experimental devices, particularly to a measuring device for testing wave dissipation characteristics of a comb-typed permeable breakwater with arc-shaped walls in an experimental flume, which utilizes its own structural characteristics and uses a measuring instrument to test the wave dissipation performance when it interacts with waves.

BACKGROUND

Human activities, such as port operations or aquaculture, need to be carried out in relatively stable waters, so wave dissipation and prevention have become an important guarantee for normal operation of some maritime facilities. However, the traditional gravity breakwater has some defects of high engineering costs, long construction periods, water pollution and sediment deposition in the harbor basin caused by poor water exchange, which cannot fulfill the ecological concept and environmental protection requirements of modern green port construction. Moreover, most of the conventional permeable dike structures can only play a single role in wave prevention and wave dissipation. Therefore, nowadays countries all over the world are trying to look for and develop renewable energy, and wave energy is the undeveloped renewable energy with the greatest potential in the world, so the development and utilization of wave energy has gradually become the research focus. At present, the existing measuring instruments have some shortcomings, such as mismatched installation of comb-typed breakwater with arc-shaped wall, high costs, and large interference from external environment and so on.

SUMMARY

An objective of the invention is to overcome the shortcomings of the prior art, and to provide a measuring device for testing wave dissipation characteristics of a comb-typed permeable breakwater with arc-shaped walls in a flume, which mainly solves the problems that the conventional breakwater cannot realize the exchange of water before and after the breakwater, and the open-hole permeable breakwater structure not only fulfills wave dissipation characteristics, but also provides a feasible supporting foundation for the installation test of offshore wave energy conversion devices, etc. Moreover, the measuring device solves the problems that the existing test instrument cannot be directly used to measure the wave dissipation characteristics of the comb-typed permeable breakwater with arc-shaped walls, the price is relatively high, and the existing test instrument is greatly interfered by the external environment.

According to technical solutions provided by the invention: a measuring device for testing wave dissipation characteristics of a comb-typed permeable breakwater with arc-shaped walls in a flume may include three parts: a comb-typed permeable breakwater with arc-shaped walls, wave height measuring instrument fixing and adjusting devices, and a wave height measuring instrument data collecting and processing equipment.

The comb-typed permeable breakwater with arc-shaped walls may include multiple upright arc-shaped caissons, a back plate, partition plates and L-shaped connecting plates, a bottom plate, a water inlet and an air outlet. Upper parts of the multiple upright arc-shaped caissons back to wave side are connected to the back plate, the partition plates are disposed on middle parts of the multiple upright arc-shaped caissons, and end parts of the partition plates are connected to a lower end of the back plate. The plurality of upright arc-shaped caissons, the back plate and the partition plates are an integrated structure. A side of each of the L-shaped connecting plates is installed at bottoms of the multiple upright arc-shaped caissons, and the other side of each of the L-shaped connecting plates is connected to the bottom plate. One the multiple upright arc-shaped caissons is provided with the water inlet on a wave-facing surface at the bottom and the air outlet at a top.

Each of the wave height measuring instrument fixing and adjusting devices may include leveling screws, a bracket, a large sleeve rod, a bidirectional sleeve, a vertical control screw, a horizontal control screw, a small sleeve rod, a sleeve, a clamping ring and a wave height measuring instrument. The bracket stands across the top ends of the two walls of the flume, and is a stand structure formed by fixedly connecting horizontal transverse bars, vertical bars and horizontal longitudinal bars. An upper horizontal longitudinal bar is sleeved with the sleeve, and a lower horizontal longitudinal bar is sleeved with the bidirectional sleeve. The leveling screws are disposed in reserved threaded holes at a top of the bracket to horizontally adjust the bracket. The large sleeve rod is vertically and fixedly connected to a lower end of the sleeve. An upper end of the small sleeve rod is internally sleeved on the large sleeve rod, and a lower end of the small sleeve rod penetrates through the bidirectional sleeve. The bidirectional sleeve is provided with the vertical control screw for controlling a telescopic movement of the small sleeve rod. The bidirectional sleeve is provided with the horizontal control screw for controlling a horizontal displacement of the large sleeve rod and the small sleeve rod. The clamping ring may include two circular-arc-shaped metallic sheets and is fixedly connected to a side surface of a lower end of the small sleeve rod. The wave height measuring instrument is fixedly arranged in a middle of the clamping ring and is connected to the small sleeve rod through the clamping ring, and a height of the wave height measuring instrument changes with the telescopic movement of the small sleeve rod. The wave height measuring instrument data collecting and processing equipment is placed on an instrument operating platform outside the flume, and is connected with the wave height measuring instrument through a data cable and configured to acquire data from the wave height measuring instrument, process the acquired data and output for display.

In an embodiment of the invention, the bracket is a frame structure (also referred to as a stand structure) formed by fixedly connecting two horizontal transverse bars, two vertical bars and two horizontal longitudinal bars, and one horizontal longitudinal bar is fixedly connected between the two horizontal transverse bars. The sleeve is sleeved on the horizontal longitudinal bar between the two horizontal transverse bars. Upper ends of the two vertical bars are respectively fixedly connected to the middle parts of the two horizontal transverse bars, and lower ends of the two vertical bars are fixedly connected to the other horizontal longitudinal bar and the bidirectional sleeve is sleeved on the other horizontal longitudinal bar at the lower end of the bracket; threaded holes are reserved at both ends of the two horizontal transverse bars.

In an embodiment of the invention, the leveling screws are installed in the reserved threaded holes at both ends of the horizontal transverse bars, and the leveling screws are rotated to adjust the lengths of the leveling screws protruding from openings of the threaded holes and thereby adjusting a levelness of the bracket.

The invention may mainly have the following beneficial effects: 1. according to the specific environment of the experimental flume in the laboratory, the top ends of two walls of the flume are intended for supporting the wave height measuring instrument fixing and adjusting devices, so that materials are saved and other resources of the laboratory are not occupied; 2. the wave height measuring instrument fixing and adjusting devices can control the horizontal and vertical movement of the wave height measuring instrument, and the measurable position is flexible and changeable; 3. each part of the whole measuring device is easy to disassemble and easy to install, which is very suitable for use in the experimental flume; 4. compared with the conventional breakwater, the comb-typed permeable breakwater with arc-shaped walls saves materials, is light and easy to construct, has strong integrity, and all parts are separate and organically combined. It is possible to carry out measurement tests on wave dissipation performance of comb-typed permeable breakwater with arc-shaped walls of different scales according to different experimental flumes; and 5. compared with the conventional permeable breakwater, the comb-typed permeable breakwater with arc-shaped walls can not only play the role of wave prevention and wave dissipation, but also convert wave energy.

Figure 1:
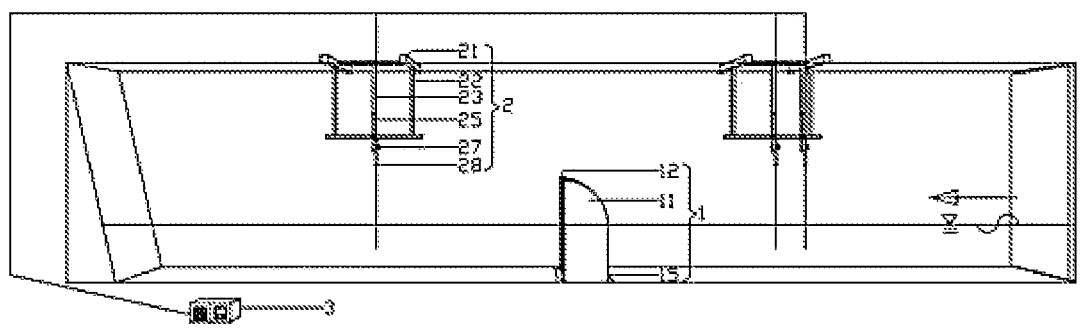
FIG. 1 is a schematic structural diagram of the whole device of the present invention.

Description of reference numerals: 1. comb-typed permeable breakwater with arc-shaped walls, 11. upright arc-shaped caisson, 12. back plate, 13. partition plate, 14. L-shaped connecting plate, 15. bottom plate, 16. fixing bolts, 17. water inlet, 18 air outlet, 2 wave height measuring instrument fixing and adjusting device, 21. leveling screw, 22. bracket, 221. horizontal transverse bar, 222. vertical bar, 223. horizontal longitudinal bar, 23. large sleeve rod, 24. bidirectional sleeve, 241. vertical control screw, 242. horizontal control screw, 25. small sleeve rod, 26. sleeve, 27. clamping ring, 28. wave height measuring instrument, 3. wave height measuring instrument data collecting and processing equipment.

DETAILED DESCRIPTION OF EMBODIMENTS

For the convenience of further understanding the contents, features and functions of the invention, the detailed description is as follows in combination with the accompanying drawings.

Figure 2:
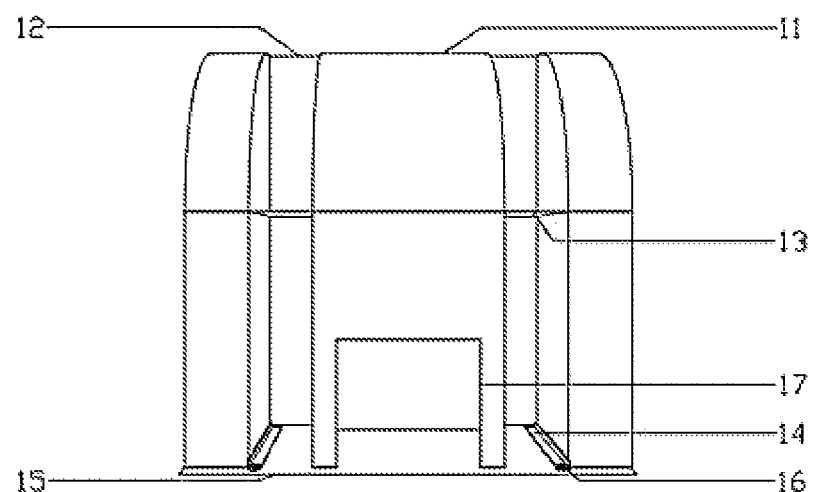
FIG. 2 is a schematic front view of the structure of the comb-typed permeable breakwater with arc-shaped walls of the invention.
Figure 3:
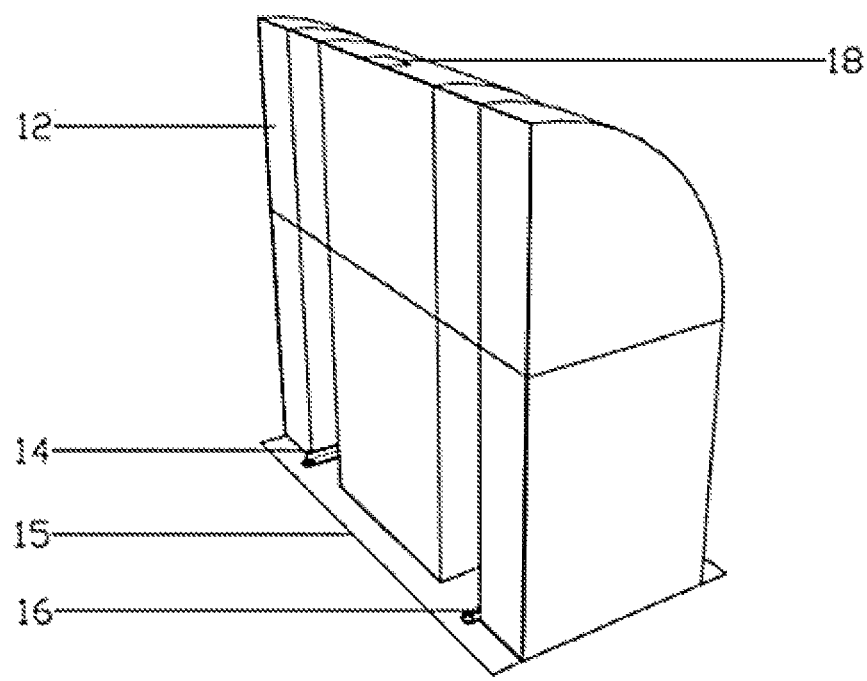
FIG. 3 is a schematic rear view of the structure of the comb-typed permeable breakwater with arc-shaped walls of the invention.
Figure 4:
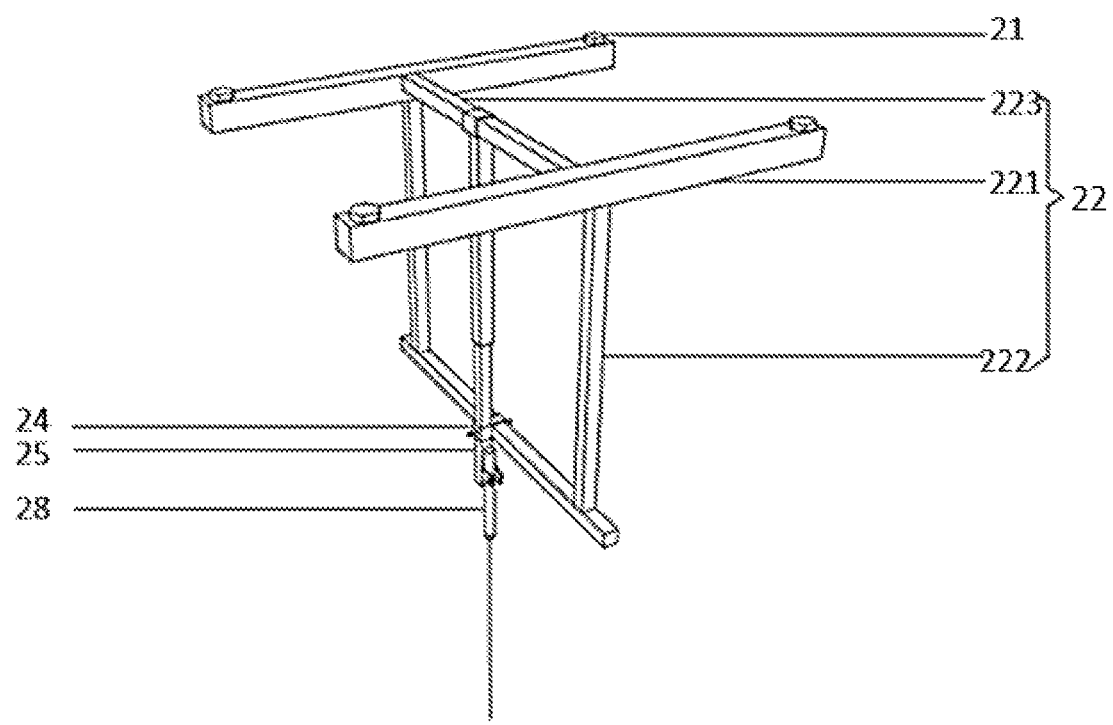
FIG. 4 is a structural schematic diagram of a wave height measuring instrument fixing and adjusting device of the invention.
Figure 5:
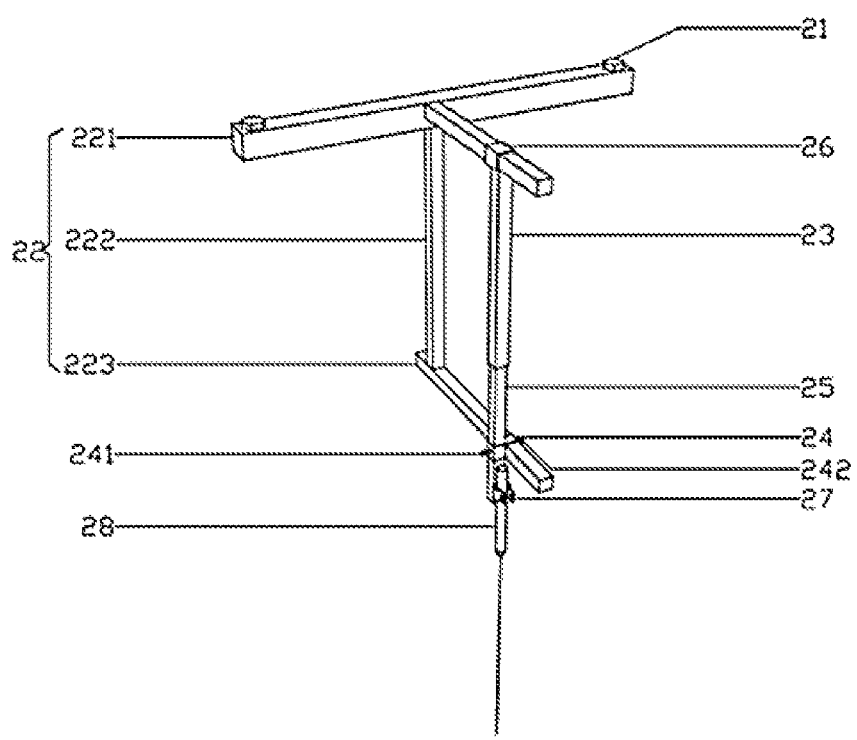
FIG. 5 is a partial structural diagram of the wave height measuring instrument fixing and adjusting device of the invention.

Referring to FIG. 1-FIG. 5, a measuring device for testing wave dissipation characteristics of comb-typed permeable breakwater with arc-shaped walls in a flume may include three parts: a comb-typed permeable breakwater with arc-shaped walls 1, wave height measuring instrument fixing and adjusting devices 2, and a wave height measuring instrument data collecting and processing equipment 3.

The comb-typed permeable breakwater with arc-shaped walls 1 may include multiple upright arc-shaped caissons 11, a back plate 12, partition plates 13 and L-shaped connecting plates 14, a bottom plate 15, a water inlet 17 and an air outlet 18. The multiple upright arc-shaped caissons 11 are arranged at certain intervals with different size, and upper parts thereof back to wave side are connected with the back plate 12. The partition plates 13 are disposed on middle parts of the multiple upright arc-shaped caissons 11, and end parts of the partition plates 13 are connected to a lower end of the back plate 12. The multiple upright arc-shaped caissons 11, the back plate 12 and the partition plates 13 are an integrated structure. A side of each of the L-shaped connecting plates 14 is installed at bottoms of the multiple upright arc-shaped caissons 11, and the other side of each of the L-shaped connecting plates 14 is reserved with connecting holes and connected to the bottom plate 15 through fixing bolts 16. A top of one of the multiple vertical caissons 11 is provided with the air outlet 18 near the back plate 12, and a lower of its wave-facing surface is provided with the water inlet 17.

Each of the wave height measuring instrument fixing and adjusting devices 2 may include leveling screws 21, a bracket 22, a large sleeve rod 23, a bidirectional sleeve 24, a vertical control screw 241, a horizontal control screw 242, a small sleeve rod 25, a sleeve 26, a clamping ring 27 and a wave height measuring instrument 28. The bracket 22 stands across top ends of the two walls of the flume and is a stand structure formed by fixedly connecting two horizontal transverse long bars 221 (also referred to as horizontal transverse bar), two vertical bars 222 and two horizontal longitudinal bars 223. One horizontal longitudinal bar 223 is fixedly connected between the two horizontal transverse long bars 221, the (one) horizontal longitudinal bar 223 is sleeved with the sleeve 26. Upper ends of the two vertical bars 222 are respectively fixedly connected to the middle parts of the horizontal transverse long bars 221, and lower ends of the two vertical bars 222 are fixedly connected to the other horizontal longitudinal bar 223 and the bidirectional sleeve 24 is sleeved on the other horizontal longitudinal bar 223 at the lower end of the bracket 22. Threaded holes are reserved at both ends of the horizontal transverse long bars 221. There are four leveling screws 21 in total, which are respectively installed in reserved threaded holes at the top of the bracket 22 and the levelness of the bracket 22 is adjusted by turning leveling screws 21, followed by adjusting the length of the leveling screws coming out of thread openings. The large sleeve rod 23 is vertically installed on the horizontal longitudinal rod 223 between the two horizontal transverse rod 221, and the large sleeve rod 23 is connected to the horizontal longitudinal rod 223 through the sleeve 26 to facilitate horizontal movement. An upper end of the small sleeve rod 25 is internally sleeved on the large sleeve rod 23 and is telescopic, and a lower end of the small sleeve rod 25 penetrates through the bidirectional sleeve 24. The vertical control screw 241 is arranged on the bidirectional sleeve 24 to control the telescopic movement of the small sleeve rod 25. The bidirectional sleeve 24 is provided with the horizontal control screw 242 for controlling the horizontal displacement of the large sleeve rod 23 and the small sleeve rod 25. The clamping ring 27 may include two circular-arcshaped metallic sheets and is fixedly connected to a side surface of a lower end of the small sleeve rod 25. The wave height measuring instrument 28 is fixedly arranged in the middle of the clamping ring 27, is connected with the small sleeve rod 25 through the clamping ring 27, and a height of the wave height measuring instrument 28 changes with the telescopic movement of the small sleeve rod 25.

The wave height measuring instrument data collecting and processing equipment 3 is placed on an instrument operating platform outside the flume, and is connected to the wave height measuring instrument 28 through a data cable and configured to acquire data from the wave height measuring instrument 28, process the acquired data and output for display. For example, the wave height measuring instrument data collecting and processing equipment 3 may be a computer system such as a personal computer.

As for the measuring device for testing wave dissipation characteristics of comb-typed permeable breakwater with arc-shaped walls in the experimental flume, when in use, the measuring device is assembled and installed in the experimental flume according to design, while the wave height measuring instrument is placed at a required position according to test requirements, and the horizontal and vertical positions thereof are adjusted to ensure test accuracy.

Although the illustrated embodiments of the invention have been described above in combination with the drawings, the invention is not limited to the above specific embodiments, which are only illustrative and not restrictive. Under the description of the invention, more forms can be made by those skilled in the art without departing from the purpose of the invention and the protection of the claims, all of which shall be subjected to the protection scope of the invention.

What is claimed is:

1. A measuring device for testing wave dissipation characteristics of a comb-typed permeable breakwater with arc-shaped walls in a flume, comprising:
   a comb-typed permeable breakwater with arc-shaped walls, wave height measuring instrument fixing and adjusting devices, and a wave height measuring instrument data collecting and processing equipment;
   wherein the comb-typed permeable breakwater with arc-shaped walls comprises a plurality of upright arc-shaped caissons, a back plate, partition plates and L-shaped connecting plates, a bottom plate, a water inlet and an air outlet; upper parts of the plurality of upright arc-shaped caissons back to wave side are connected to the back plate, the partition plates are disposed on middle parts of the plurality of upright arc-shaped caissons, ends part of the partition plates are connected to a lower end of the back plate; and the plurality of upright arc-shaped caissons, the back plate and the partition plates are an integrated structure; a side of each of the L-shaped connecting plates is disposed at bottoms of the plurality of upright arc-shaped caissons, and another side of each of the L-shaped connecting plates is connected to the bottom plate; one of the plurality of upright arc-shaped caissons is provided with the water inlet on a wave-facing surface at the bottom and the air outlet at a top;
   wherein each of the wave height measuring instrument fixing and adjusting devices comprises leveling screws, a bracket, a large sleeve rod, a bidirectional sleeve, a vertical control screw, a horizontal control screw, a small sleeve rod, a sleeve, a clamping ring and a wave height measuring instrument; the bracket stands across top ends of the two walls of the flume, and is a stand structure formed by fixedly connecting horizontal transverse bars, vertical bars and horizontal longitudinal bars, wherein an upper horizontal longitudinal bar is sleeved with the sleeve, and a lower horizontal longitudinal bar is sleeved with the bidirectional sleeve; the leveling screws are disposed in reserved threaded holes respectively at a top of the bracket to horizontally adjust the bracket; the large sleeve rod is vertically and fixedly connected to a lower end of the sleeve; an upper end of the small sleeve rod is internally sleeved on the large sleeve rod, and a lower end of the small sleeve rod penetrates through the bidirectional sleeve; the bidirectional sleeve is provided with the vertical control screw for controlling a telescopic movement of the small sleeve rod; the bidirectional sleeve is provided with the horizontal control screw for controlling a horizontal displacement of the large sleeve rod and the small sleeve rod; the clamping ring comprises two circular-arc-shaped metallic sheets and is fixedly connected to a side surface of a lower end of the small sleeve rod; the wave height measuring instrument is fixedly arranged in a middle of the clamping ring and is connected to the small sleeve rod through the clamping ring, and a height of the wave height measuring instrument changes with the telescopic movement of the small sleeve rod;
   wherein the wave height measuring instrument data collecting and processing equipment is placed on an instrument operating platform outside the flume, and is connected to the wave height measuring instrument through a data cable and configured to acquire data from the wave height measuring instrument, process the acquired data and output for display;
   the bracket is the stand structure formed by fixedly connecting two horizontal transverse bars, two vertical bars and two horizontal longitudinal bars, and one horizontal longitudinal bar is fixedly connected between the two horizontal transverse bars; upper ends of the two vertical bars are respectively fixedly connected to middle parts of the two horizontal transverse bars, and lower ends of the two vertical bars are fixedly connected to the other horizontal longitudinal bar and the bidirectional sleeve is sleeved on the other horizontal longitudinal bar at the lower end of the bracket; threaded holes are reserved at both ends of the two horizontal transverse bars.

2. The measuring device according to claim 1, wherein the leveling screws are respectively installed in the reserved threaded holes at both ends of the horizontal transverse bars, and the leveling screws are rotated to adjust lengths of the leveling screws protruding from openings of the threaded holes and thereby adjusting a levelness of the bracket.

* * * * *